United States Patent

Kurek et al.

[15] 3,651,517

[45] Mar. 21, 1972

[54] DIGITAL-TO-ANALOG CONVERTER WITH ISOLATED CURRENT SOURCES

[72] Inventors: Nicholas B. Kurek, Granada Hills; James F. Gruder, Manhattan Beach; Dan Cameron, Jr., Woodland Hills, all of Calif.

[73] Assignee: Information International, Inc., Boston, Mass.

[22] Filed: July 13, 1970

[21] Appl. No.: 54,490

[52] U.S. Cl. ....................................340/347 DA, 307/251

[51] Int. Cl. ....................................H03k 13/04

[58] Field of Search ....................307/205, 251, 237, 304; 340/347

[56] References Cited

UNITED STATES PATENTS

| | | | |
|---|---|---|---|
| 3,508,249 | 4/1970 | Gordon | 340/347 |
| 3,541,354 | 11/1970 | Basham | 307/251 |
| 3,416,005 | 12/1968 | Reich | 307/304 |
| 3,473,043 | 10/1969 | James | 307/304 |

*Primary Examiner*—Thomas A. Robinson
*Attorney*—Lindenberg, Freilich and Wasserman

[57] ABSTRACT

A digital-to-analog converter is disclosed employing a binary weighted current divider connected to the summing junction of an operational amplifier. Current switches selectively couple constant current sources to junctions in the current divider in accordance with binary digits at data input terminals. Each of the current sources consist of an operational amplifier having its output connected to the gate of a field-effect transistor (FET). The source of the FET is connected to a regulated power supply through a high resistance resistor and the drain of the FET is connected to a current switch through an isolation FET having its gate connected to circuit ground by a source of bias voltage and a filter capacitor in parallel. By controlling the regulated voltage to current sources, the analog output signal may be multiplied by a factor to form a product proportional to NS, where N is the number being converted and S is the control signal for the regulated voltage.

10 Claims, 1 Drawing Figure

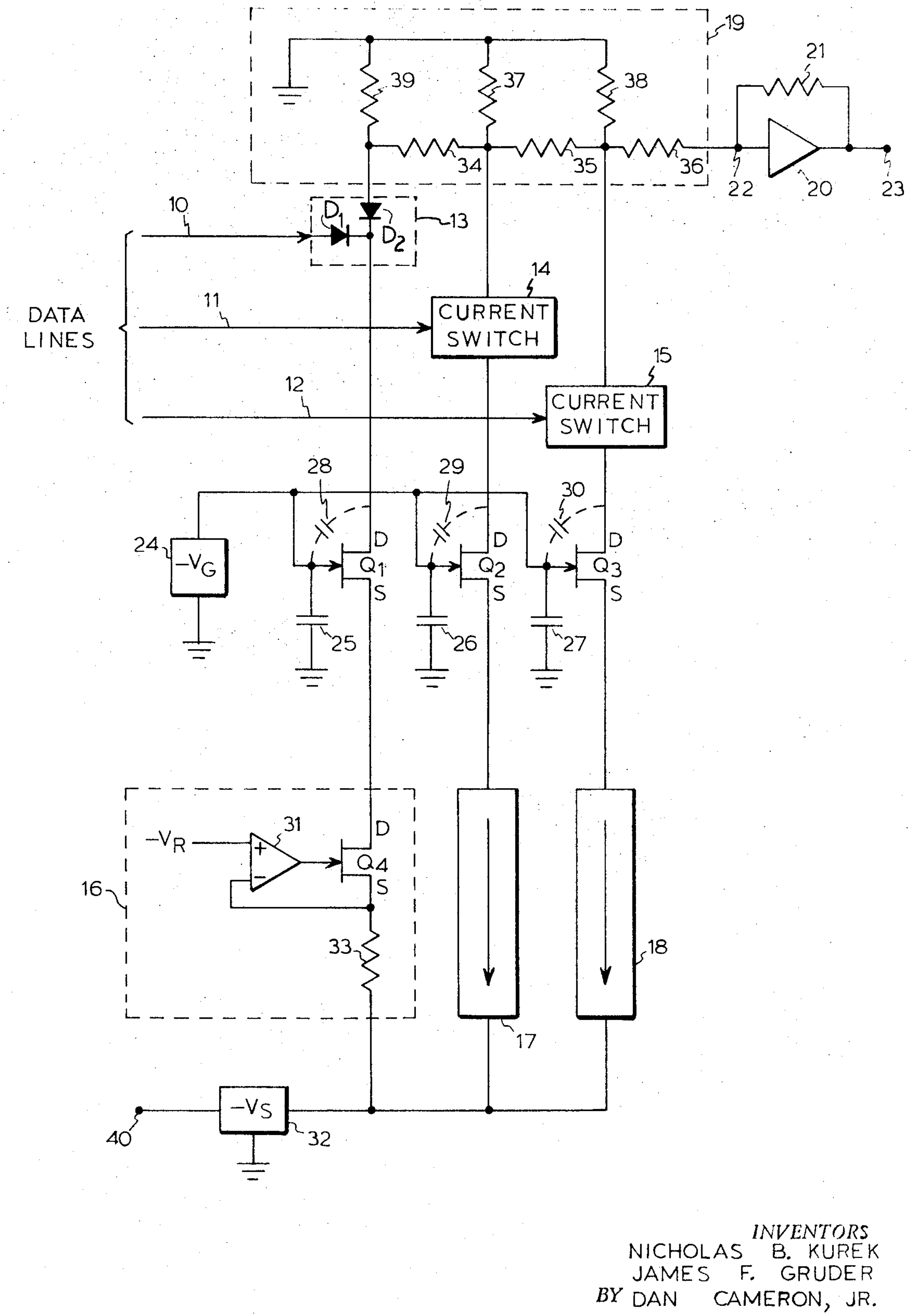
INVENTORS
NICHOLAS B. KUREK
JAMES F. GRUDER
BY DAN CAMERON, JR.
Lindenberg, Freilich & Wasserman
ATTORNEYS

DIGITAL-TO-ANALOG CONVERTER WITH ISOLATED CURRENT SOURCES

BACKGROUND OF THE INVENTION

This invention relates to a digital-to-analog converter, and more particularly to a technique for isolating current sources of a digital-to-analog converter from current switches coupling current sources to means for producing a voltage signal proportional to the sum of a plurality of currents without sacrificing speed or accuracy.

In the past, digital-to-analog converters have been commercially available with either high speed or high accuracy, but not both, because the design of an electronic circuit which provides high speed generally degrades accuracy, while the design of an electronic circuit which provides high accuracy is generally one which lacks high speed in its response.

If high accuracy is desired, each current source should be designed with very stable components, such as a low drift operational amplifier. But then after a switching transient has disturbed a current source, a finite recovery period is required before the output of the digital-to-analog converter stabilizes, and the more stable the current source is made, the longer that recovery time becomes. If the current sources are designed for high speed recovery after a switching transient, then the stability of the current sources is degraded and the accuracy of the output from the digital-to-analog converter is decreased.

OBJECTS AND SUMMARY OF THE INVENTION

An object of this invention is to provide a digital-to-analog converter characterized by both high speed and high accuracy.

Another object of this invention is to provide isolation of digitally operated current switches from stable current sources to allow high accuracy to be obtained in a digital-to-analog converter without any sacrifice in speed or accuracy.

Still another object of this invention is to provide a multiplying digital-to-analog converter.

These and other objects of the invention are achieved in a digital-to-analog converter having a plurality of constant current sources, one for each order of a number represented by digital signals to be converted, and a plurality of current switches, one for each current source. The current switches are provided to switch currents to a summing means for producing a voltage signal proportional to the sum of the currents. Isolation of current sources from current switches is achieved by coupling each current source to its associated current switch through the source-drain channel of a separate field-effect transistor (FET). Each FET has its gate connected to circuit ground through a source of bias potential and a capacitor in parallel. The capacitor is connected to the gate of the FET at a point as close to the source-drain channel as possible, and the capacitor is selected to have a value of capacitance coupling the drain of the FET to its gate in order to shunt switching transients to ground.

In accordance with a further feature of the present invention, each current source consists of an operational amplifier having differential input terminals and an output terminal connected to the gate of a second FET. A reference voltage is connected to one input terminal and the source of the FET is connected directly to the second input terminal. The source of the FET is also connected to a regulated voltage source through a resistor. In that manner, a precise voltage is maintained across the resistor to fix the magnitude of the current which flows through the associated current switch. By varying the regulated voltage in proportion to an input signal S, an analog signal proportional to the product NS is formed, where N is the digital number being converted.

The novel features that are considered characteristic of this invention are set forth with particularity in the appended claims. The invention will best be understood from the following description when read in conjunction with the accompanying drawing.

BRIEF DESCRIPTION OF THE DRAWING

The sole FIGURE is a schematic diagram of a digital-to-analog converter in accordance with the present invention.

DESCRIPTION OF PREFERRED EMBODIMENTS

Referring to the drawing, a digital-to-analog converter is shown schematically, partially in block diagram form, with provision for digital-to-analog conversion of only three binary digits since the principle of the invention to be described with reference to only three bits is applicable to any number of bits.

Data lines 10, 11 and 12 control current switches 13, 14 and 15 in accordance with data binary digits having weights equal to $2^{-2}$, $2^{-1}$ and $2^{0}$. Each of the current switches 13, 14 and 15 either blocks or passes current from respective current sources 16, 17 and 18 to a network 19 connected to the input terminal of an operational amplifier 20 according to the binary code that appears on the data lines. A feedback resistor 21 provides for operation of the amplifier as a current summing means.

The currents from the sources 16, 17 and 18 may be equal, in which case the network 19 connected to a summing junction 22 at the input terminal of an operational amplifier 20 will consist of a ladder network to reduce the current from a given switch into the summing junction 22 to a magnitude proportional to the binary order associated with the switch. In that manner, the network 19 cooperates with the operational amplifier 20 and the feedback resistor 21 to provide at an output terminal 23 a voltage signal proportional to the sum of a plurality of currents controlled by digital signals on the data lines 10, 11 and 12.

If the current sources 16, 17 and 18 do not provide precision currents that are equal in magnitude, but instead provide currents which are weighted in accordance with the binary order of digital signals on the data lines 10, 11 and 12 applied to associated switches 13, 14 and 15, the network 19 will consist of simply coupling resistors between the switches 13, 14 and 15, and the summing junction 22, all coupling resistors being of equal value. Then the current that is delivered to the summing junction 22 is proportional to the binary number that appears on the data lines. The operational amplifier converts the current to a suitably scaled voltage, the scaling factor being determined by the product of the feedback resistor 21 and the sum of the precision currents reaching the summing junction.

The use of weighted current sources would simplify the network 19, but sources of constant currents of equal magnitude are preferred, even though the network 19 must then be a current dividing ladder network as shown, because then each of the switches 13, 14 and 15 may be the same. Moreover, the transients introduced by the operation of a current switch for a given order tends to be independent of the current magnitude desired for that order. If equal current sources are used with a current dividing ladder network, the transient introduced by a given switch is then attenuated in the same proportion as the current through that switch.

In either case, with sources of currents of equal magnitudes or sources of currents of weighted magnitudes, operation of a given current switch will produce transients on the line coupling it to its associated current source. If that line were to go directly to the current source, a disturbance would be introduced into the current source by stray capacitance that exists between the output terminal thereof and one or more terminals or junctions within the circuit of the current source. Thus, when a data line changes level, a step of several volts with a very fast rise time may be coupled directly into the current source. Sufficient time must then be provided for the current source to recover from this disturbance and restore the precision current to its proper value, typically 0.5 microseconds, before the signal at the output terminal 23 will become stable. Slightly higher speed can be achieved at significantly greater expense if circuits with faster recovery are used in the current sources, but for significantly higher speed the faster recovery of the circuits in the current sources can be achieved only at the expense of accuracy.

To achieve significantly greater speeds without sacrificing accuracy, field-effect transistors $Q_1$, $Q_2$ and $Q_3$ are employed to couple the switches 13, 14 and 15 to the output terminals of the respective current sources 16, 17 and 18. The source of each transistor is connected to its associated current source while the drain of each transistor is connected to its associated switch. A bias voltage $-V_G$ is applied to the gates of the transistors from a regulated voltage source 24 such that, for a given field-effect transistor, the gate-to-source voltage will provide conduction through the transistor without saturation when its associated switch connected to the transistor source is turned on by a binary 1 signal.

The gate of the transistors $Q_1$, $Q_2$ and $Q_3$ are connected to circuit ground by respective filter capacitors 25, 26 and 27. Their function is to shunt to circuit ground switching transients coupled by inherent capacitance between the drain and the gate of the transistors $Q_1$, $Q_2$ and $Q_3$. The drain-to-gate capacitances for the transistors are schematically illustrated by respective capacitors 28, 29 and 30 connected by dotted lines.

In practice, each external filter capacitor, such as capacitor 25, between a gate and circuit ground is selected to be greater than 1,000 times the drain-to-gate capacitance of the associated transistor so that any disturbance on the drain coupled to the gate will not affect the regulated voltage source 24 because of the larger capacitance of the bypass filter capacitor. Then the disturbance at the transistor source is negligible and the current source is not disturbed. For example, switching transients produced by operation of the switch 13 is coupled by the drain-to-gate capacitance 28 of the transistor $Q_1$ into the capacitor 25 without disturbing the regulated voltage 24, thereby isolating the current source 16 from those switching transients. Significantly greater switching speeds may then be achieved with very stable current sources, i.e., without degrading accuracy.

The switching speeds of the current switches 13, 14 and 15 are not affected by these isolation transistors and filter capacitors since the drain-to-gate capacitance of a given isolation transistor is substantially the same as inherent capacitance coupling into the current source from its output terminal, particularly where, as in the preferred embodiment shown, the output stage of the current source comprises a field-effect transistor having the same drain-to-gate capacitance as the isolation transistor.

In this preferred embodiment, the current source 16 is shown as comprising an operational amplifier 31 having differential inputs and an output terminal connected to the gate of a field-effect transistor $Q_4$. The drain and source of the transistor $Q_4$ are connected to the source of the transistor $Q_1$ and to a source of regulated voltage $-V_S$ through a precision resistor 33. The positive input of the operational amplifier is connected directly to the source of the transistor $Q_4$. The difference between the regulated voltage $-V_S$ and the reference voltage $-V_R$ will fix the voltage across the precision resistor 33, thereby fixing with precision the magnitude of the current delivered by the transistor $Q_4$. If the transistor $Q_4$ is selected to be of the same type as the field-effect transistor $Q_1$, the drain-to-gate capacitance will be substantially the same for both transistors so that the argument that the isolation transistor will not affect the switching speed of the switch 13 will hold precisely. Each of the current sources is the same so that the current sources 17 and 18 are represented only in block diagram form.

When the current sources 16, 17 and 18 are the same, the network 19 is provided as a current dividing ladder network as shown. All of the coupling resistors 34, 35 and 36 are of equal value R while the current dividing resistor at each stage connected to circuit ground, such as resistors 37 and 38, are equal to 2R, except a current dividing resistor 39 associated with the switch 13 for the least significant bit of the binary number to be converted which has a value of R. Consequently, the input impedance of the ladder network at the junction connected to the switch 13 is two-thirds R. The input impedances of the network at the junctions to which the switches 14 and 15 are connected are also two-thirds R.

Each of the precision currents is selectively switched by one of the current switches 13, 14 and 15 to a different node at a junction of three resistors (except switch 13 which switches a current to a node which has only two resistors). Because of the R-2R weighting of the resistors, one-third of the current flows toward the summing junction 22 in all cases. When the current encounters intervening nodes, one-half is shunted to circuit ground while the other half continues flowing toward the summing junction 22. Since each of the current sources 16, 17 and 18 is an infinite impedance source, no current flows out of the nodes. Binary weighting is thus achieved by successively halving the current a number of times equal to the power of two represented by the controlling bit.

By superposition, the total current flowing to the summing junction 22 is the binary weighted sum of the individual currents that have been switched on. Each is divided by three and then by the appropriate power of two. For example, one-third of the current from source 17 is divided in half once; this is the proper current corresponding to the binary digit on data line 11 with a weight of $2^{-1}$.

Each of the switches 13, 14 and 15 may consist of a simple diode current switch. For example, the current switch 13 may consist of diodes $D_1$ and $D_2$. When the diode $D_1$ is biased by a voltage to forward bias it sufficiently for conduction, such as +1 volt, the diode $D_2$ will be reverse biased, and all of the current produced by the current source 16 will be conducted through the diode $D_1$. When the input signal to the switch 13 is changed from +1 volt (binary 0) to a −3 volt (binary 1) level, the diode $D_1$ will be reverse biased, and all of the current from the source 16 is transmitted through the diode $D_2$. The ladder resistance R must be chosen low enough so that the current sources cannot drive the ladder nodes and diode $D_2$ more negative than about −2.5 volts. Thus, as the input signal is switched from a binary 0 to a binary 1, the current from the source 16 is switched from the data line 10 to the network 19.

In the preferred configuration, if the regulated voltage $-V_S$ is not fixed but controlled externally, a multiplication function is achieved because the output voltage $V_{23}$ at terminal 23 is proportional to the product of the binary number N on the data lines and the regulated voltage, plus an offset value $K_2$. This is expressed in mathematical terms by the following equation:

$$V_{23}=K_1\cdot(V_S)\cdot(N)+K_2 \quad (1)$$

where the K's are constants dependent upon the specific design, and $V_S$ and N are independent variables. Recalling that the magnitude of the sum of the precision currents is proportional to the difference between $-V_S$ and $-V_R$ across the precision resistor $R_{33}$ in the source 16, according to the equation $$I=K_3\cdot(V_R-V_S)/R_{33} \quad (2)$$

and that the output voltage $V_{23}$ is proportional to the sum of the weighted currents that have been switched on, equation (1) may be written more comprehensively as follows:

$$V_{23}=K_4\cdot\Sigma I=K_5\cdot\Sigma\,(V_R-V_S)/R_{33} \quad (3)$$

where the K's are again constants dependent upon the specific design. The sum $\Sigma\,(V_R-V_S)/R_{33}$ is controlled by the number N appearing on the data lines, and $V_S$ is a common factor among the individual currents. Therefore, the output voltage $V_{23}$ truly contains the term proportional to the product of $N$ and $V_S$ in the first equation above. If the factor $V_S$ is controlled by an input signal $S$ at a terminal 40, the output signal $V_{23}$ is proportional to the product SN.

This technique of multiplying a number $N$ (being converted to analog form) by a variable $S$ (applied to the control terminal 40 for the $-V_S$ voltage source 32) is applicable to any type of digital-to-analog converter using constant current sources. All that is required is that the constant currents be controlled in amplitude by an input signal proportional to the variable S. The constant currents may be equal, as in the preferred embodiment illustrated, or weighted, and the control may be exercised by controlling the bias voltage of the constant current source, as in the preferred embodiment illustrated, or in some other manner, as by varying the value of the resistor 33 in response to the variable input signal, or by varying the reference voltage $-V_R$ instead. If some other configuration is employed for the constant current source, still other techniques for varying the amplitudes of the constant currents will occur to those skilled in the art.

Although particular embodiments of the invention have been described and illustrated herein, it is recognized that modifications and variations may readily occur to those skilled in the art. For example, the circuits can be inverted to use positive voltages and P-channel field-effect transistors. Also, voltage magnitudes can be adjusted to other convenient levels. Consequently, it is intended that the claims be interpreted to cover such modifications and equivalents.

What is claimed is:

1. A digital-to-analog converter comprising
   - a plurality of constant current sources, one for each order of a number represented by digital signals to be converted,
   - summing means for producing a voltage signal proportional to the sum of weights of digital signals of said number to be converted by adding a plurality of currents,
   - a plurality of current switches, one for each order of said number adapted to switch a current to said means from an associated current source in response to a digital signal,
   - a plurality of isolation field-effect transistors, one associated with each current source having its source electrode connected to its associated current source, and its gate electrode connected to a source of bias voltage, and
   - a plurality of capacitors, one associated with each isolation field-effect transistor and connected between the gate of its associated field-effect transistor and circuit ground.

2. A digital-to-analog converter as defined in claim 1 including means for varying the current amplitude of each of said constant current sources in proportion to a variable input signal, whereby said voltage signal produced by said summing means is proportional to the product of said variable input signal and said number represented by digital signals to be converted.

3. A digital-to-analog converter as defined by claim 1, wherein each of said current sources comprises
   - an output field-effect transistor having a gate, a source and a drain,
   - an operational amplifier having first and second differential input terminals, and having an output terminal connected to said gate of said output field-effect transistor,
   - a source of reference voltage connected to said first input terminal of said operational amplifier,
   - means connecting said source of said output field-effect transistor to said second input terminal of said operational amplifier,
   - a source of regulated voltage,
   - a resistor connecting said source of said output field effect transistor to said regulated power supply voltage source, and
   - means connecting said drain of said output field-effect transistor directly to said source of said isolation field-effect transistor.

4. A digital-to-analog converter as defined in claim 3 wherein each of said current sources includes means for varying the voltage difference between said source of reference voltage and said source of regulated voltage in proportion to a variable input signal, whereby said voltage signal produced by said summing means is proportional to the product of said variable input signal and said number represented by digital signals to be converted.

5. A digital-to-analog converter as defined by claim 3 wherein
   - said resistor, reference voltage and regulated voltage are the same for all current sources, whereby the currents of all current sources are equal, and
   - said means for producing a voltage signal proportional to the sum of a plurality of currents comprises a current dividing network having a plurality of input terminals, one connected to each current source, and an output terminal, and an operational amplifier with a feedback resistor having its input terminal connected to said output terminal of said current dividing network.

6. A digital-to-analog converter as defined in claim 5 wherein each of said current sources include means for varying the voltage difference between said source of reference voltage and said source of regulated voltage in proportion to a variable input signal, whereby said voltage signal produced by said summing means is proportional to the product of said variable input signal and said number represented by digital signals to be converted.

7. A digital-to-analog converter as defined in claim 5 wherein each of said switches comprises
   - a first diode connected between said isolation field-effect transistor and an input terminal of said network, said first diode being poled for forward conduction of current from one of said constant current sources, and
   - a second diode connected to a point between said first diode and said isolation field-effect transistor, and poled for forward conduction of current from said one of said constant current sources, said second diode being adapted to receive, at a terminal remote from the terminal thereof connected to said first diode, a digital signal representing a binary 0 of a given polarity and amplitude sufficient for said second diode to conduct, and a digital signal representing a binary 1 of a given polarity and amplitude sufficient for said second diode to be back biased.

8. A multiplying digital-to-analog converter comprising
   - a plurality of constant current sources, one for each order of a number represented by digital signals to be converted,
   - means for varying the current amplitude of each of said constant current sources in proportion to a variable input signal,
   - summing means for producing a voltage signal proportional to the sum of weights of digital signals of said number to be converted by adding a plurality of currents, and
   - a plurality of current switches, one for each order of said number adapted to switch a current to said means from an associated current source in response to a digital signal, whereby said voltage signal produced by said summing means is proportional to the product of said variable input signal and said number represented by digital signals to be converted.

9. A multiplying digital-to-analog converter as defined by claim 8, wherein each of said constant current sources comprises
   - an output field-effect transistor having a gate, a source and a drain,
   - an operational amplifier having first and second differential input terminals, and having an output terminal connected to said gate of said output field-effect transistor,
   - a source of reference voltage connected to said first input terminal of said operational amplifier,
   - means connecting said source of said output field-effect transistor to said second input terminal of said operational amplifier,
   - a source of regulated voltage,
   - a resistor connecting said source of said output field-effect transistor to said regulated voltage source,
   - means connecting said drain of said output field transistor to one of said current switches, and
   - said means for varying the current amplitude of each of said current sources comprises means for varying the difference between said reference voltage and said regulated voltage.

10. A multiplying digital-to-analog converter as defined by claim 9 wherein
   - said resistor, reference voltage and regulated power supply voltage are the same for all current sources, whereby the currents of all current sources are equal, and
   - said source of regulated voltage comprises a source of regulated voltage controlled by a signal at a control terminal, and said variable input signal is applied to said control terminal, whereby said means for varying the difference between said reference voltage and said regulated voltage is comprised of said signal controlled source of regulated voltage.

* * * * *